US012620677B2

(12) United States Patent  
Kubota et al.

(10) Patent No.: US 12,620,677 B2  
(45) Date of Patent: May 5, 2026

(54) MANUFACTURING METHOD FOR WELDED STRUCTURE, AND BATTERY

(71) Applicant: TOYOTA JIDOSHA KABUSHIKI KAISHA, Toyota (JP)

(72) Inventors: Seiko Kubota, Toyota (JP); Akio Sato, Toyota (JP); Seigo Fujishima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 650 days.

(21) Appl. No.: 18/091,700

(22) Filed: Dec. 30, 2022

(65) Prior Publication Data

US 2023/0299428 A1     Sep. 21, 2023

(30) Foreign Application Priority Data

Mar. 15, 2022    (JP) ................................. 2022-040421

(51) Int. Cl.  
    *H01M 50/516*    (2021.01)  
    *H01M 50/54*    (2021.01)  
    *H01M 50/552*    (2021.01)

(52) U.S. Cl.  
    CPC ......... *H01M 50/516* (2021.01); *H01M 50/54* (2021.01); *H01M 50/552* (2021.01)

(58) Field of Classification Search  
    CPC .. H01M 50/516; H01M 50/54; H01M 50/552; H01M 50/536; H01M 50/55; B23K 26/0613  
    See application file for complete search history.

(56) References Cited

U.S. PATENT DOCUMENTS

| | | | |
|---|---|---|---|
| 2017/0274473 A1* | 9/2017 | Naito ................... | B23K 26/067 |
| 2018/0026252 A1 | 1/2018 | Kumazawa et al. | |
| 2018/0245616 A1 | 8/2018 | Kumazawa et al. | |

FOREIGN PATENT DOCUMENTS

| | | | | |
|---|---|---|---|---|
| JP | 2018-012125 A | 1/2018 | | |
| JP | 2020-089919 A | 6/2020 | | |
| JP | 2020-518095 A | 6/2020 | | |
| WO | WO-2015186168 A1 * | 12/2015 | ............ | H01M 50/50 |
| WO | 2018/195218 A1 | 10/2018 | | |

OTHER PUBLICATIONS

Machine translation of WO-2015186168-A1 (Year: 2025).*

* cited by examiner

*Primary Examiner* — Tong Guo  
*Assistant Examiner* — Albert Michael Hilton  
(74) *Attorney, Agent, or Firm* — Dinsmore & Shohl LLP

(57) ABSTRACT

A manufacturing method for a welded structure includes preparing a stack in which a plate-shaped first welded member made of a first metal and a plate-shaped second welded member made of a second metal are stacked, and applying a laser beam to the first welded member such that multiple loop weld marks with the same central axis are provided. In applying the laser beam, the laser beam is applied such that irradiation energy gradually reduces from a predetermined one of the weld marks, located on an inner side, toward an outermost periphery.

4 Claims, 8 Drawing Sheets

S21

PREPARE STACK IN WHICH
FIRST WELDED MEMBER AND
SECOND WELDED MEMBER ARE STACKED

S22

APPLY LASER BEAM TO ONE OF
FIRST WELDED MEMBER AND
SECOND WELDED MEMBER SUCH THAT
MULTIPLE LOOP WELD MARKS WITH
SAME CENTRAL AXIS ARE FORMED

MANUFACTURING METHOD FOR WELDED STRUCTURE, AND BATTERY

CROSS-REFERENCE TO RELATED APPLICATION

This application claims priority to Japanese Patent Application No. 2022-040421 filed on Mar. 15, 2022, incorporated herein by reference in its entirety.

BACKGROUND

1. Technical Field

The disclosure relates to a manufacturing method for a welded structure, which welds a plate-shaped first welded member made of a first metal to a plate-shaped second welded member made of a second metal, and a battery in which a plate-shaped positive electrode terminal made of a first metal is welded to a plate-shaped negative electrode terminal made of a second metal.

2. Description of Related Art

As a laser welding method of welding thin-plate welded members stacked on top of each other by application of a laser beam, WO 2015/186168 describes a method of applying a laser beam while moving the laser beam along preset multiple-loop weld lines, in which the laser beam is moved along an outer loop weld line before the laser beam is moved along an inner loop weld line.

SUMMARY

In the laser welding method described in WO 2015/186168, a laser beam is applied under constant welding conditions such that the inner areas of the weld lines are sequentially lowered by a predetermined amount to reliably weld the thin plates even with a gap between the thin plates. To perform welding in a state where portions to be welded are not clear due to the gap, the sheets can be actually welded in an outermost peripheral area. When the sheets are dissimilar metals, more than estimated amount of alloy may be produced at an outermost weld mark. In this case, alloy is formed at the outermost peripheral portion where stress tends to concentrate, so there are concerns that the strength of a joint decreases.

The disclosure provides a manufacturing method for a welded structure, which is capable of maintaining good joint strength by reducing alloy to be formed at an outermost periphery, and a battery in which both terminals are joined with each other in a good condition.

A manufacturing method for a welded structure according to the disclosure includes preparing a stack in which a plate-shaped first welded member made of a first metal and a plate-shaped second welded member made of a second metal are stacked, and applying a laser beam to the first welded member such that multiple loop weld marks with the same central axis are provided. In applying the laser beam, the laser beam is applied such that irradiation energy gradually reduces from a predetermined one of the weld marks, located on an inner side, toward an outermost periphery.

With the above configuration, a laser beam is applied such that irradiation energy gradually reduces from a predetermined one of weld marks, located on an inner side, toward an outermost periphery. Therefore, it is possible to gradually reduce an alloy layer produced by application of a laser beam from the predetermined one of the weld marks toward the outermost periphery. Thus, it is possible to relatively firmly join the first welded member with the second welded member by allowing an alloy layer to some extent at the inner part where stress to be loaded is small, so it is possible to reduce the amount of alloy contained in the weld mark located at the outermost periphery where stress tends to concentrate. As a result, it is possible to reduce occurrence of cracks at the outermost periphery where stress tends to concentrate, so good joint strength is maintained.

In the manufacturing method according to the disclosure, in applying the laser beam, multiple trajectories of laser beams respectively applied in association with the multiple loop weld marks may be discontinuous.

With the above configuration, by providing discontinuous multiple trajectories of laser beams applied, irradiation energy of the laser beam for each trajectory is more easily changed.

In the manufacturing method according to the disclosure, in applying the laser beam, each of the multiple trajectories may have a circular shape.

With the above configuration, it is possible to uniformly apply a laser beam over in the circumferential direction.

In the manufacturing method according to the disclosure, in applying the laser beam, the multiple loop weld marks may be provided such that a depth of the weld mark gradually reduces from the predetermined one of the weld marks, located on the inner side, toward the outermost periphery.

With the above configuration as well, the depth of the weld mark gradually reduces from the predetermined one of the weld marks toward the outermost periphery. Therefore, the first welded member is relatively firmly joined with the second welded member by allowing an alloy layer to some extent at the inner part where stress to be loaded is small; whereas it is possible to reduce the amount of alloy contained in the weld mark located at the outermost periphery where stress tends to concentrate.

In the manufacturing method according to the disclosure, in applying the laser beam, the laser beam may be applied such that an amount of alloy produced from the first welded member and the second welded member and contained in the weld mark located at the outermost periphery is less than an amount of alloy contained in the predetermined one of the weld marks, located on the inner side.

With the above configuration as well, it is possible to relatively firmly join the first welded member with the second welded member by allowing an alloy layer to some extent at the inner part where stress to be loaded is small, so it is possible to reduce the amount of alloy contained in the weld mark located at the outermost periphery where stress tends to concentrate.

In the manufacturing method according to the disclosure, in applying the laser beam, the laser beam may be applied such that a spot diameter gradually reduces from the predetermined one of the weld marks, located on the inner side, toward the outermost periphery.

With the above configuration as well, it is possible to relatively firmly join the first welded member with the second welded member by allowing an alloy layer to some extent at the inner part where stress to be loaded is small, so it is possible to reduce the amount of alloy contained in the weld mark located at the outermost periphery where stress tends to concentrate.

A battery according to the disclosure includes a battery stack that includes a first single cell and a second single cell each having a plate-shaped positive electrode terminal made of a first metal and a plate-shaped negative electrode terminal made of a second metal and in which the first single cell and the second single cell are stacked such that each of the positive electrode terminals and an associated one of the negative electrode terminals are arranged in a stacking direction, and multiple loop weld marks welding each of the positive electrode terminals to the associated one of the negative electrode terminals. The multiple loop weld marks are provided with the same central axis, and a depth of the weld mark gradually reduces from a predetermined one of the weld marks, located on an inner side, toward an outermost periphery.

With the above configuration, in the multiple loop weld marks that join each of the positive electrode terminals with an associated one of the negative electrode terminals, it is possible to relatively firmly join the positive electrode terminal with the negative electrode terminal by allowing an alloy layer to some extent at the inner part where stress to be loaded is small, so it is possible to reduce the amount of alloy contained in the weld mark located at the outermost periphery where stress tends to concentrate. As a result, it is possible to reduce occurrence of cracks at the outermost periphery where stress tends to concentrate, so the positive electrode terminal and the negative electrode terminal are joined with each other while good joint strength is maintained.

In the battery according to the disclosure, an amount of alloy produced from the positive electrode terminal and the negative electrode terminal and contained in the weld mark located at the outermost periphery may be less than an amount of the alloy contained in the predetermined one of the weld marks, located on the inner side.

With the above configuration as well, in the multiple loop weld marks that join each of the positive electrode terminals with an associated one of the negative electrode terminals, it is possible to relatively firmly join the positive electrode terminal with the negative electrode terminal by allowing an alloy layer to some extent at the inner part where stress to be loaded is small, so it is possible to reduce the amount of alloy contained in the weld mark located at the outermost periphery where stress tends to concentrate.

In the battery according to the disclosure, a width of the weld mark may gradually reduce from the predetermined one of the weld marks, located on the inner side, toward the outermost periphery.

With the above configuration as well, in the multiple loop weld marks that join each of the positive electrode terminals with an associated one of the negative electrode terminals, it is possible to relatively firmly join the positive electrode terminal with the negative electrode terminal by allowing an alloy layer to some extent at the inner part where stress to be loaded is small, so it is possible to reduce the amount of alloy contained in the weld mark located at the outermost periphery where stress tends to concentrate.

According to the disclosure, it is possible to provide a manufacturing method for a welded structure, which is capable of maintaining good joint strength by reducing alloy to be produced at the outermost part, and a battery in which both terminals are joined with each other in good conditions.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described in detail with reference to the accompanying drawings. In the embodiments described below, like reference signs denote the same or common portions, and the description thereof will not be repeated.

First Embodiment

Figure 1:
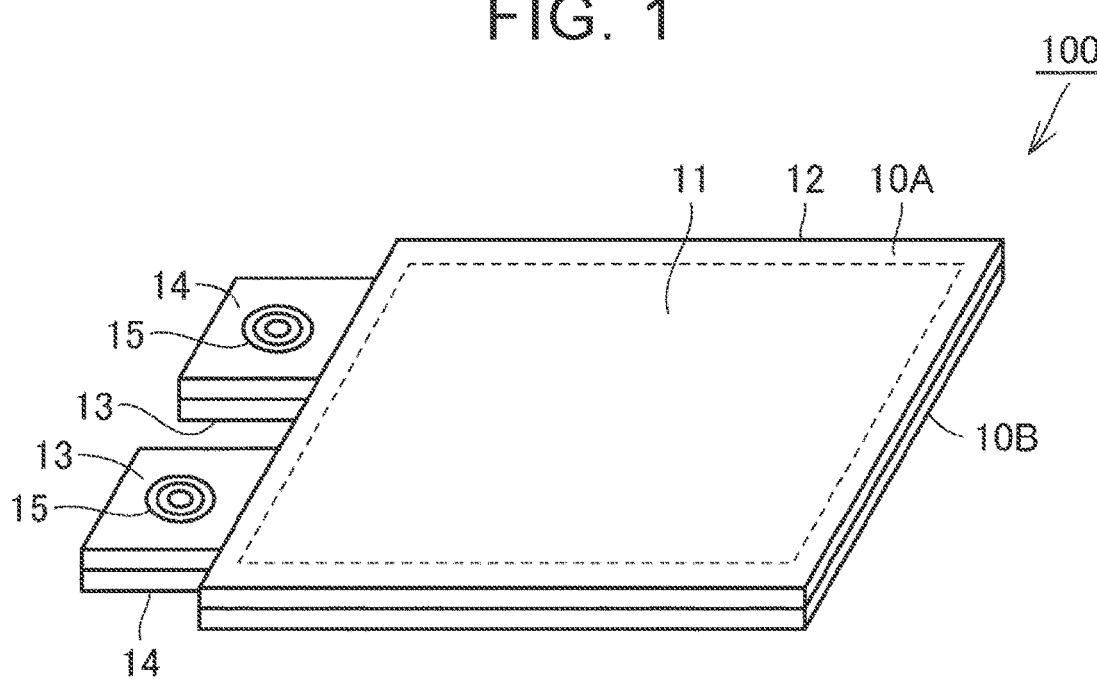
FIG. 1 is a schematic perspective view showing a battery according to a first embodiment.

FIG. 1 is a schematic perspective view showing a battery according to a first embodiment. The battery according to the first embodiment will be described with reference to FIG. 1. A plurality of the batteries according to the first embodiment is combined as a module and mounted on a vehicle, such as a hybrid electric vehicle and an electrified vehicle.

As shown in FIG. 1, a battery 100 according to the first embodiment includes a first single cell 10A and a second single cell 10B. In the present embodiment, for the sake of convenience, the case where the number of single cells included in the battery 100 is two is illustrated; however, the number of single cells is not limited to two and may be three or more.

The first single cell 10A and the second single cell 10B each are, for example, a laminated battery. Each of the first single cell 10A and the second single cell 10B includes an electrode assembly 11, a case 12, a positive electrode terminal 13, and a negative electrode terminal 14.

The electrode assembly 11 includes a positive electrode current collector foil on which an electrode active material layer is provided and a negative electrode current collector foil on which a negative electrode active material layer is provided. A plurality of pairs of positive electrode current collector foil and negative electrode current collector foil with a separator interposed therebetween may be stacked or a plurality of pairs of positive electrode active material layer and negative electrode active material layer with a solid electrolyte layer interposed therebetween may be stacked.

The case 12 accommodates the electrode assembly 11 inside. The case 12 is formed by welding laminate films at their peripheral portions. The laminate films are, for example, films made of aluminum alloy of which the surface is coated with a resin material. The laminate films may be resin films.

The positive electrode terminal 13 is connected to a portion where a plurality of positive electrode current collector foils is bound and is provided so as to protrude from the case 12. The positive electrode terminal 13 is a plate-shaped member made of a first metal and may be regarded as a first welded member. The positive electrode terminal 13 is made of, for example, aluminum.

The negative electrode terminal 14 is connected to a portion where a plurality of negative electrode current collector foils is bound and is provided so as to protrude from the case 12. The negative electrode terminal 14 is a plate-shaped member made of a second metal different from the first metal and may be regarded as a second welded member. The negative electrode terminal 14 is made of, for example, copper.

The first single cell 10A and the second single cell 10B are stacked such that each of the positive electrode terminals 13 and an associated one of the negative electrode terminals 14 are arranged in a stacking direction. The first single cell 10A and the second single cell 10B are stacked in this way to form a battery stack.

The battery 100 includes joints 15, each of which joins the positive electrode terminal 13 with the negative electrode terminal 14.

Figure 2:
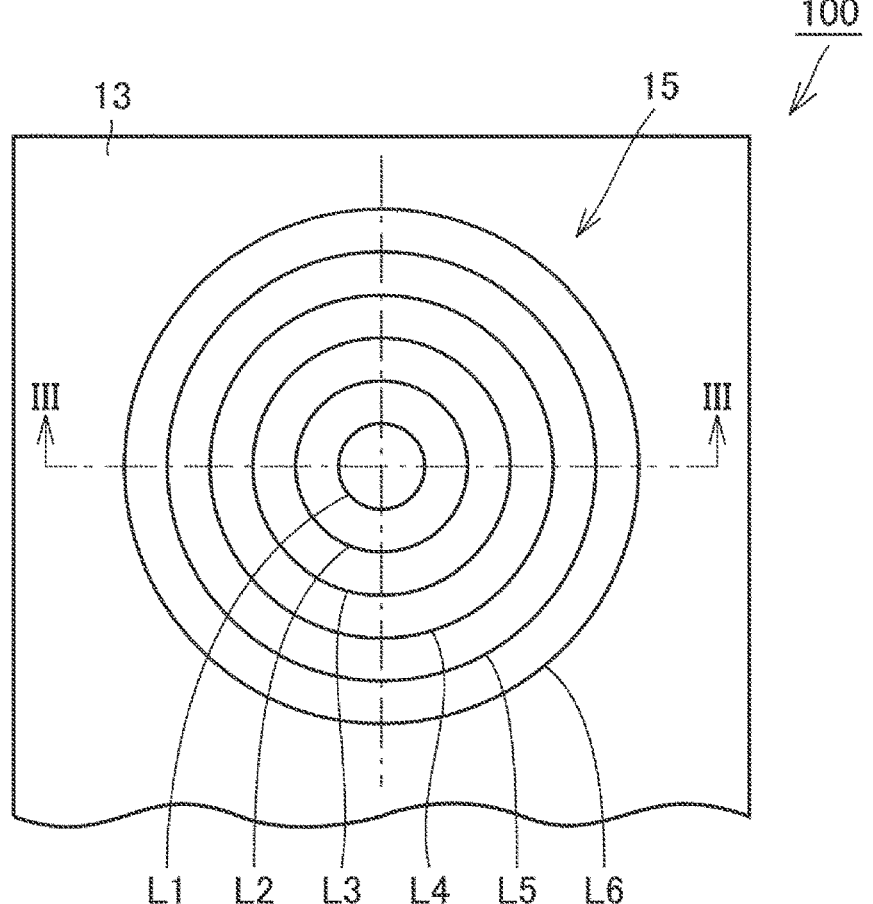
FIG. 2 is an enlarged plan view showing a joint between a positive electrode terminal and a negative electrode terminal of the battery according to the first embodiment.
Figure 3:
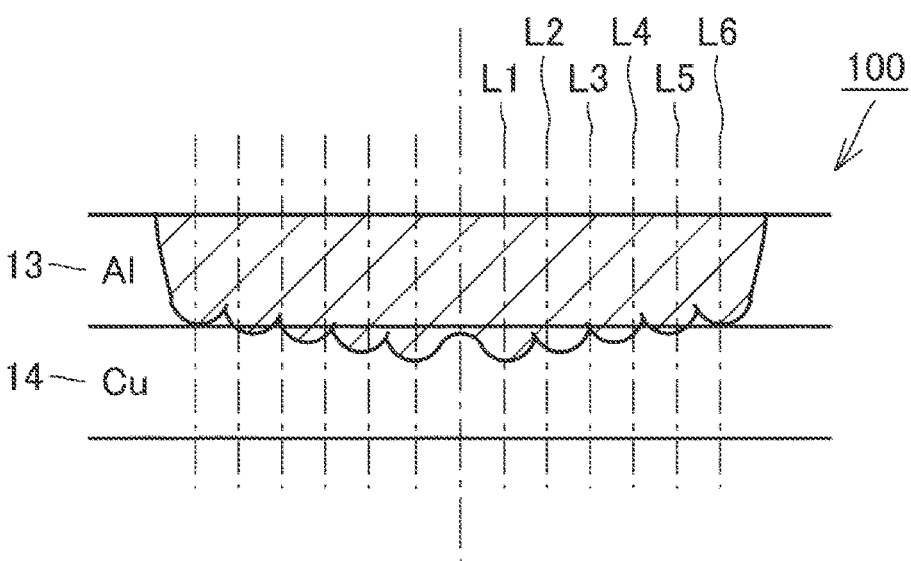
FIG. 3 is a schematic sectional view taken along the line in FIG. 2.

FIG. 2 is an enlarged plan view showing the joint between the positive electrode terminal and the negative electrode terminal of the battery according to the first embodiment. FIG. 3 is a schematic sectional view taken along the line in FIG. 2. The details of the joint 15 will be described with reference to FIG. 2 and FIG. 3.

As shown in FIG. 2 and FIG. 3, the joint 15 includes multiple loop weld marks L1, L2, L3, L4, L5, L6. The multiple loop weld marks L1, L2, L3, L4, L5, L6 have the same central axis. Each of the multiple loop weld marks L1, L2, L3, L4, L5, L6 has substantially a circular shape. The diameter (inside diameter) increases toward the outermost periphery in order of the multiple loop weld marks L1, L2, L3, L4, L5, L6.

The multiple loop weld marks L1, L2, L3, L4, L5, L6 are configured such that the depth of the weld mark gradually reduces from a predetermined one of the weld marks, located on the inner side, toward the outer periphery. Specifically, the multiple loop weld marks L1, L2, L3, L4, L5, L6 are configured such that the weld mark gradually shallows from the weld mark L1 located on the innermost side toward the weld mark L6 located at the outermost periphery.

At the weld mark L1, aluminum of the positive electrode terminal 13 and copper of the negative electrode terminal 14 are melted, and the melted aluminum penetrates into the copper side. As a result, at the weld mark L1, a significant amount of alloy layer is formed. From the weld mark L2 to the weld mark L5, the depth by which melted aluminum penetrates into the copper side gradually reduces.

At the weld mark L6 located at the outermost periphery, melted aluminum does not reach copper, and copper is not melted. Therefore, at the weld mark L6, no alloy layer is formed. In this way, the amount of alloy contained in the weld mark L6 is less than the amount of alloy contained in the weld mark L1. At the weld mark L6, an alloy layer is desirably not formed; however, a slight amount of melted aluminum may reach copper to form a small amount of alloy layer.

In this way, with the provision of the weld marks L1, L2, L3, L4, L5, L6, it is possible to relatively firmly join the positive electrode terminal 13 with the negative electrode terminal 14 by allowing an alloy layer to some extent at the inner part where stress to be loaded is small. Therefore, it is possible to reduce the alloy layer (the amount of alloy) contained in the weld mark located at the outermost periphery where stress tends to concentrate. As a result, it is possible to reduce occurrence of cracks at the outermost periphery where stress tends to concentrate, so the positive electrode terminal and the negative electrode terminal are joined with each other while good joint strength is maintained.

Figure 4:
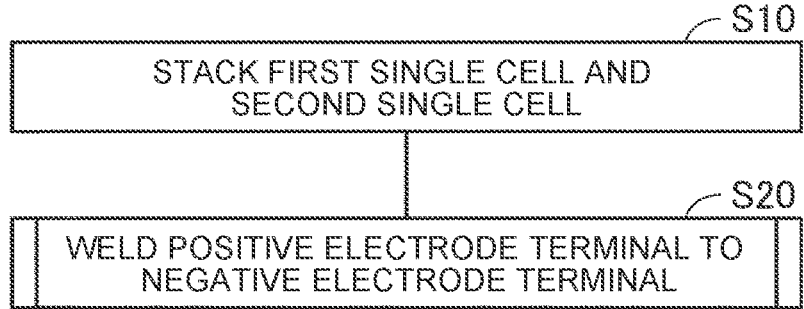
FIG. 4 is a flowchart showing a manufacturing process for the battery according to the first embodiment.

FIG. 4 is a flowchart showing a manufacturing process for the battery according to the first embodiment. A manufacturing method for the battery 100 according to the first embodiment will be described with reference to FIG. 4.

As shown in FIG. 4, the manufacturing method for the battery 100 includes a step of stacking the first single cell 10A and the second single cell 10B (S10) and a step of joining each of the positive electrode terminals 13 with an associated one of the negative electrode terminals 14 (S20).

In manufacturing the battery 100, initially, in step (S10), the first single cell 10A and the second single cell 10B are stacked such that each of the positive electrode terminals 13 and an associated one of the negative electrode terminals 14 are arranged in the stacking direction. Subsequently, in step (S20), each of the positive electrode terminals 13 and an associated one of the negative electrode terminals 14 are joined by using the manufacturing method for a welded structure according to the first embodiment. In step (S20), as will be described later, step (S21) (see FIG. 5) and step (S22) (see FIG. 5) are executed.

Figure 5:
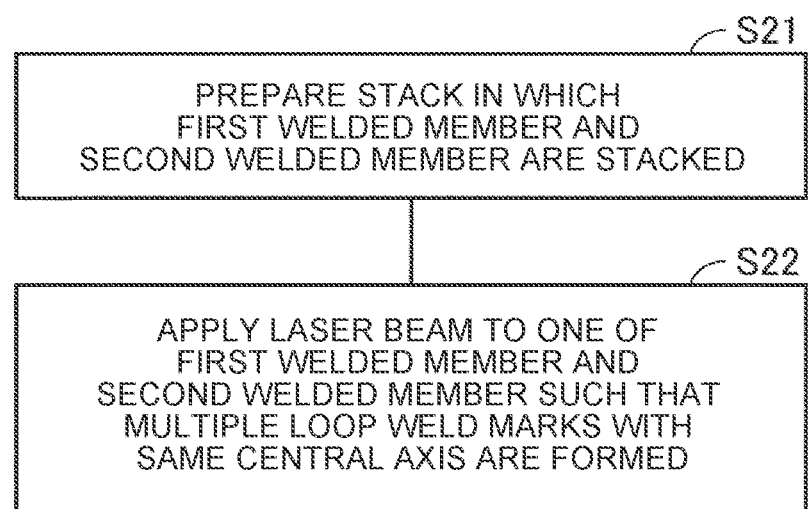
FIG. 5 is a flowchart of a manufacturing method for a welded structure that is used in a step of welding a positive electrode terminal to a negative electrode terminal in the manufacturing process for the battery according to the first embodiment.

FIG. 5 is a flowchart of a manufacturing method for a welded structure that is used in a step of welding each of the positive electrode terminals to an associated one of the negative electrode terminals in the manufacturing process for the battery according to the first embodiment.

As shown in FIG. 5, the manufacturing method for a welded structure according to the first embodiment includes preparing a stack in which a first welded member and a second welded member are stacked (S21), and applying a laser beam to the first welded member such that multiple loop weld marks with the same central axis are provided (S22).

Specifically, in step (S21), a stack in which a plate-shaped first welded member made of a first metal and a plate-shaped second welded member made of a second metal are stacked. More specifically, as described above, a battery stack in which each of the positive electrode terminals 13 and an associated one of the negative electrode terminals 14 are arranged in the stacking direction is set in a laser irradiation position.

Figure 6:
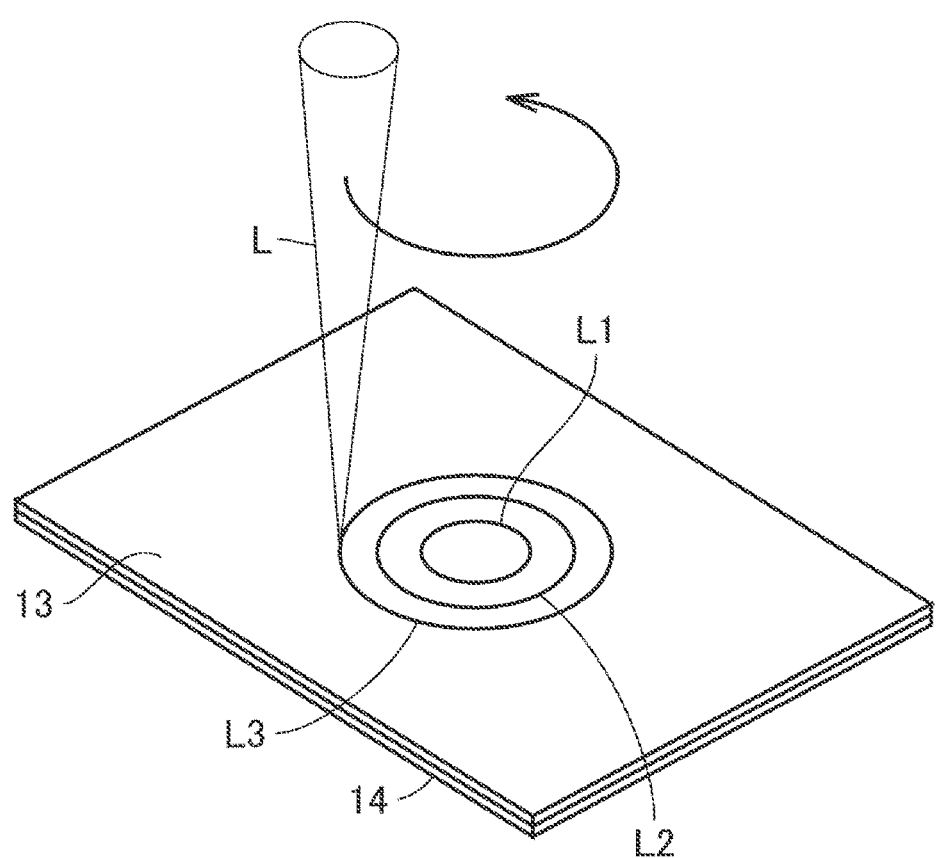
FIG. 6 is a diagram showing a step of applying a laser beam in the manufacturing method for a welded structure according to the first embodiment.

FIG. 6 is a diagram showing a step of applying a laser beam L in the manufacturing method for a welded structure according to the first embodiment.

Subsequently, as shown in FIG. 5 and FIG. 6, a laser beam L is applied to the positive electrode terminal 13 in step (S22) such that multiple loop weld marks L1, L2, L3, L4, L5, L6 with the same central axis are formed.

At this time, a laser beam L is applied such that irradiation energy gradually reduces from the predetermined one of the weld marks (specifically, the weld mark L1 located on the innermost side) toward the outermost periphery. Thus, the multiple loop weld marks L1, L2, L3, L4, L5, L6 are formed such that the depth of the weld mark gradually reduces from the weld mark L1 located on the innermost side toward the outermost periphery.

An alloy layer produced by laser irradiation is gradually reduced from the weld mark L1 located on the innermost side toward the outermost periphery. In other words, the amount of alloy contained in the weld mark L6 located at the outermost periphery is less than the amount of alloy contained in the weld mark L1 located on the innermost side.

Therefore, it is possible to relatively firmly join the positive electrode terminal 13 with the negative electrode terminal 14 by allowing an alloy layer to some extent at the inner part where stress to be loaded is small. Therefore, it is possible to reduce the amount of alloy contained in the weld mark located at the outermost periphery where stress tends to concentrate. As a result, it is possible to reduce occurrence of cracks at the outermost periphery where stress tends to concentrate, so good joint strength is maintained.

In some embodiments, multiple trajectories of laser beams respectively applied in association with the multiple loop weld marks are discontinuous. Thus, irradiation energy of a laser beam for each trajectory is more easily changed. In some embodiments, each trajectory has a circular shape. Thus, it is possible to uniformly apply a laser beam over in the circumferential direction.

It is assumed that, where the power ratio at the time of applying a laser beam to the outermost side is one, the power ratio at the time of applying a laser beam to the innermost side is two. Irradiation energy is adjusted as needed between one and two.

Through the above steps, the first welded member and the second welded member are joined with each other, and the battery 100 is manufactured.

Second Embodiment

Figure 7:
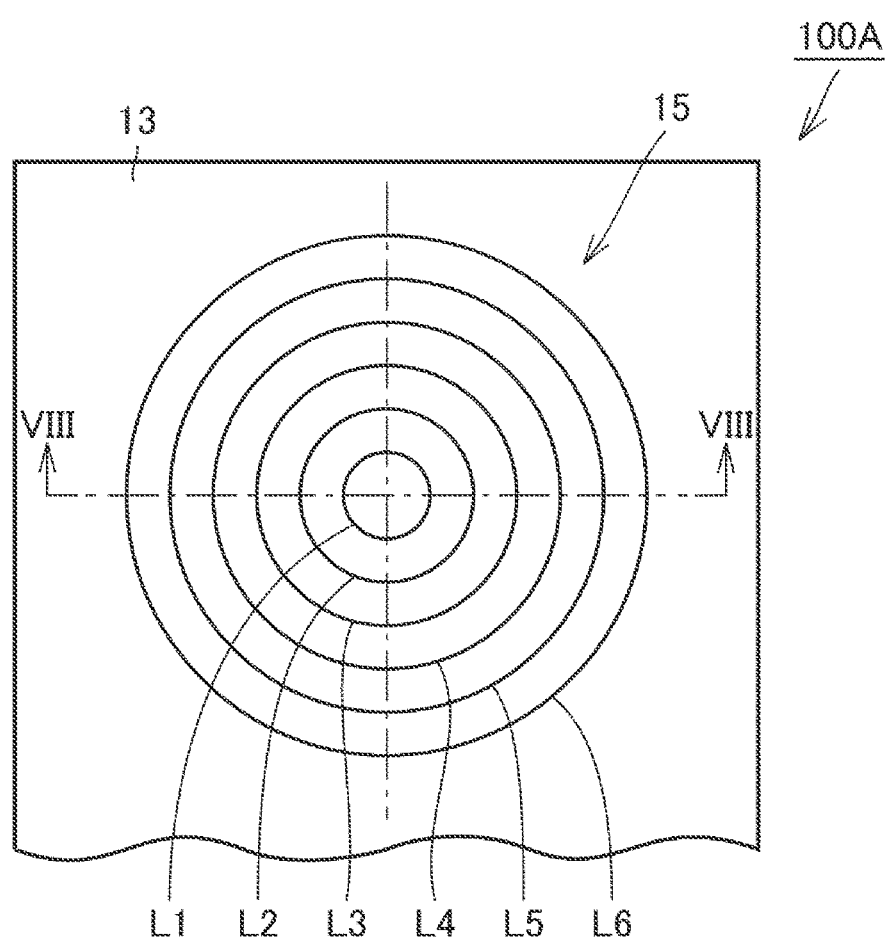
FIG. 7 is an enlarged plan view showing a joint between a positive electrode terminal and a negative electrode terminal of a battery according to a second embodiment.
Figure 8:
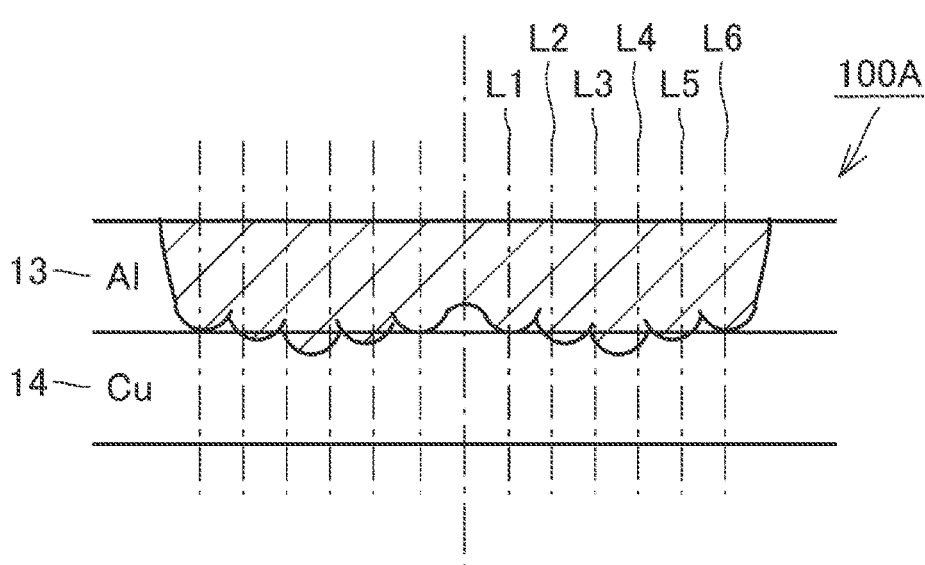
FIG. 8 is a schematic sectional view taken along the line VIII-VIII in FIG. 7.

FIG. 7 is an enlarged plan view showing a joint between a positive electrode terminal and a negative electrode terminal of a battery according to a second embodiment. FIG. 8 is a schematic sectional view taken along the line VIII-VIII in FIG. 7. A battery 100A according to the second embodiment will be described with reference to FIG. 7 and FIG. 8.

As shown in FIG. 7 and FIG. 8, the battery 100A according to the second embodiment differs from the battery 100 according to the first embodiment in the configuration of a joint 15A. The remaining configuration is substantially the same.

In the second embodiment as well, the joint 15A includes six weld marks L1, L2, L3, L4, L5, L6, and a laser beam irradiation method is different, with the result that the depths and the like of the weld marks L1, L2, L3, L4, L5, L6 are also changed.

In the second embodiment, the depth of the weld mark gradually increases from the weld mark L1 located on the innermost side toward the predetermined weld mark L4, and the depth of the weld mark gradually reduces from the predetermined weld mark L4 toward the outermost periphery (weld mark L6).

At the weld mark L1, aluminum of the positive electrode terminal 13 is melted to a location not reaching copper of the negative electrode terminal 14 or a location having slightly reached copper. Thus, an alloy layer is not present or an alloy layer is slightly present. In order of the weld marks L2, L3, L4, the depth gradually increases, and the depth by which melted aluminum penetrates into copper also gradually increases. Thus, in order of the weld marks L2, L3, L4, the alloy layer gradually increases, and, particularly, at the weld mark L4, the positive electrode terminal 13 is relatively firmly joined with the negative electrode terminal 14 by allowing an alloy layer to some extent. The depth by which melted aluminum penetrates into the copper side gradually reduces from the weld mark L4 toward the outermost peripheral weld mark L6.

At the weld mark L6 located at the outermost periphery, melted aluminum does not reach copper, and copper is not melted. Therefore, at the weld mark L6, no alloy layer is formed. In this way, the amount of alloy contained in the weld mark L6 is less than the amount of alloy contained in the weld mark L4. At the weld mark L6, an alloy layer is desirably not formed; however, a slight amount of melted aluminum may reach copper to form a small amount of alloy layer.

The battery 100A according to the second embodiment is also manufactured in compliant with the manufacturing method for the battery according to the first embodiment. In other words, the manufacturing method for a welded structure is performed in compliant with the manufacturing method for a welded structure according to the first embodiment.

In the second embodiment, in step (S22), a laser beam is applied such that irradiation energy gradually increases from the weld mark L1 located on the innermost side toward the weld mark L4 located at a predetermined inner side. Subsequently, a laser beam is applied such that irradiation energy gradually reduces from the predetermined weld mark L4 toward the outer periphery. In this case, it is assumed that, where the power ratio at the time of applying a laser beam to the outermost side is one, the power ratio at the time of applying a laser beam to the predetermined inner side (an irradiation area corresponding to the weld mark L4) is two. Irradiation energy is adjusted as needed between one and two.

Even with such a configuration, substantially similar effects to those of the battery 100 and the manufacturing method for a welded structure according to the first embodiment are obtained from the battery 100A and the manufacturing method for a welded structure according to the second embodiment.

Third Embodiment

Figure 9:
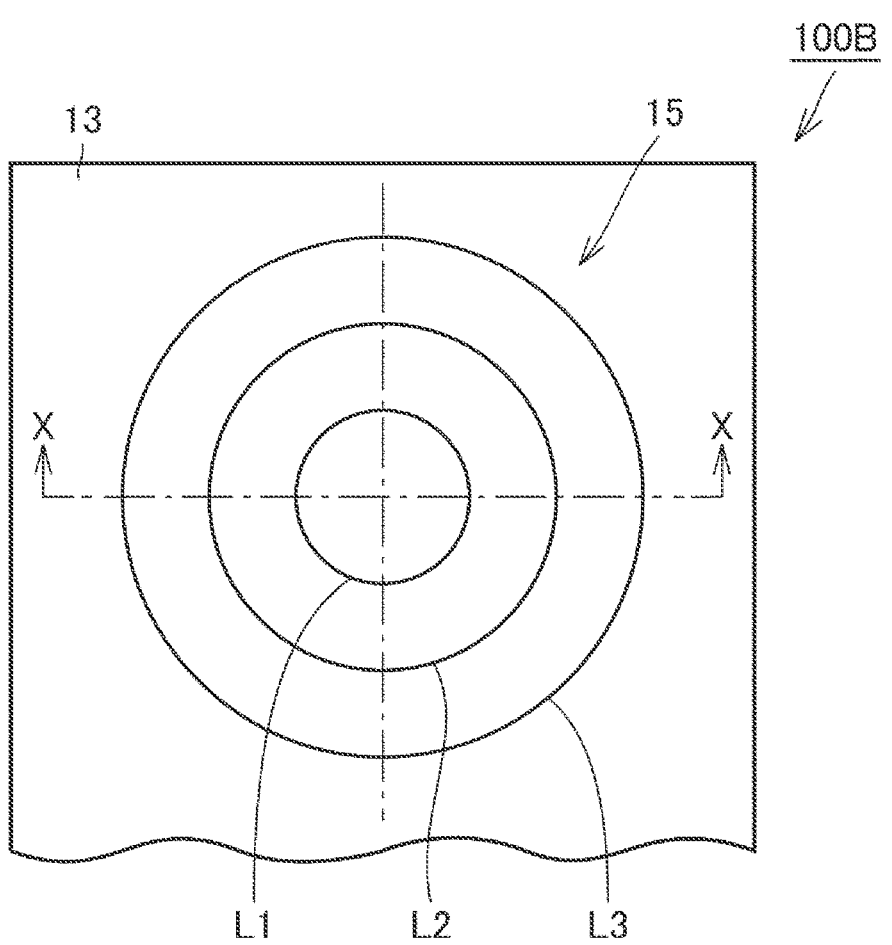
FIG. 9 is an enlarged plan view showing a joint between a positive electrode terminal and a negative electrode terminal of a battery according to a third embodiment.
Figure 10:
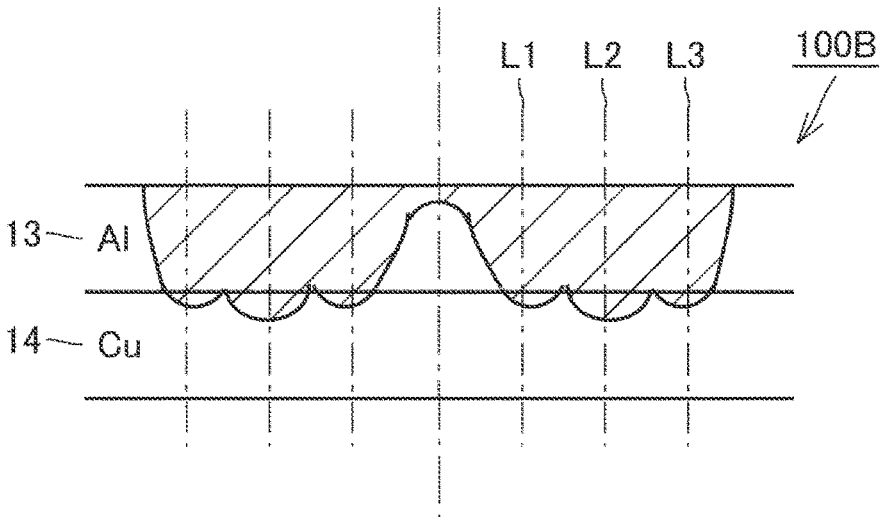
FIG. 10 is a schematic sectional view taken along the line X-X in FIG. 9.

FIG. 9 is an enlarged plan view showing a joint between a positive electrode terminal and a negative electrode terminal of a battery according to a third embodiment. FIG. 10 is a schematic sectional view taken along the line X-X in FIG. 9. A battery 100B according to the third embodiment will be described with reference to FIG. 9 and FIG. 10.

As shown in FIG. 9 and FIG. 10, the battery 100B according to the third embodiment differs from the battery 100 according to the first embodiment in the configuration of a joint 15B. The remaining configuration is substantially the same.

The joint 15B includes three weld marks L1, L2, L3 and differs from the joint 15 of the first embodiment in the laser beam irradiation method.

In the third embodiment, the depth of the weld mark gradually increases from the weld mark L1 located on the innermost side toward the predetermined weld mark L2, and the depth of the weld mark gradually reduces from the predetermined weld mark L2 toward the outermost periphery (weld mark L3).

At the weld mark L1 located on the innermost side, aluminum of the positive electrode terminal 13 is melted to a location having slightly reached copper of the negative electrode terminal 14. The aluminum reaches copper deeper at the weld mark L2 than at the weld mark L1 and relatively firmly joins the positive electrode terminal 13 with the negative electrode terminal 14 by allowing an alloy layer to some extent. The aluminum is melted to a location shallower at the weld mark L3 than at the weld mark L2. Thus, the amount of alloy contained in the weld mark L3 is less than the amount of alloy contained in the predetermined weld mark L2.

The battery 100B according to the third embodiment is also manufactured in compliant with the manufacturing method for the battery according to the first embodiment. In this case, the manufacturing method for a welded structure is performed in compliant with the manufacturing method for a welded structure according to the first embodiment.

In the third embodiment, in step (S22), a laser beam is applied such that irradiation energy gradually increases from the weld mark L1 located on the innermost side toward the weld mark L2 located at the predetermined inner side. Subsequently, a laser beam is applied such that irradiation energy gradually reduces from the predetermined weld mark L2 toward the outer periphery.

Even with such a configuration, substantially similar effects to those of the battery 100 and the manufacturing method for a welded structure according to the first embodiment are obtained from the battery 100B and the manufacturing method for a welded structure according to the third embodiment.

Fourth Embodiment

Figure 11:
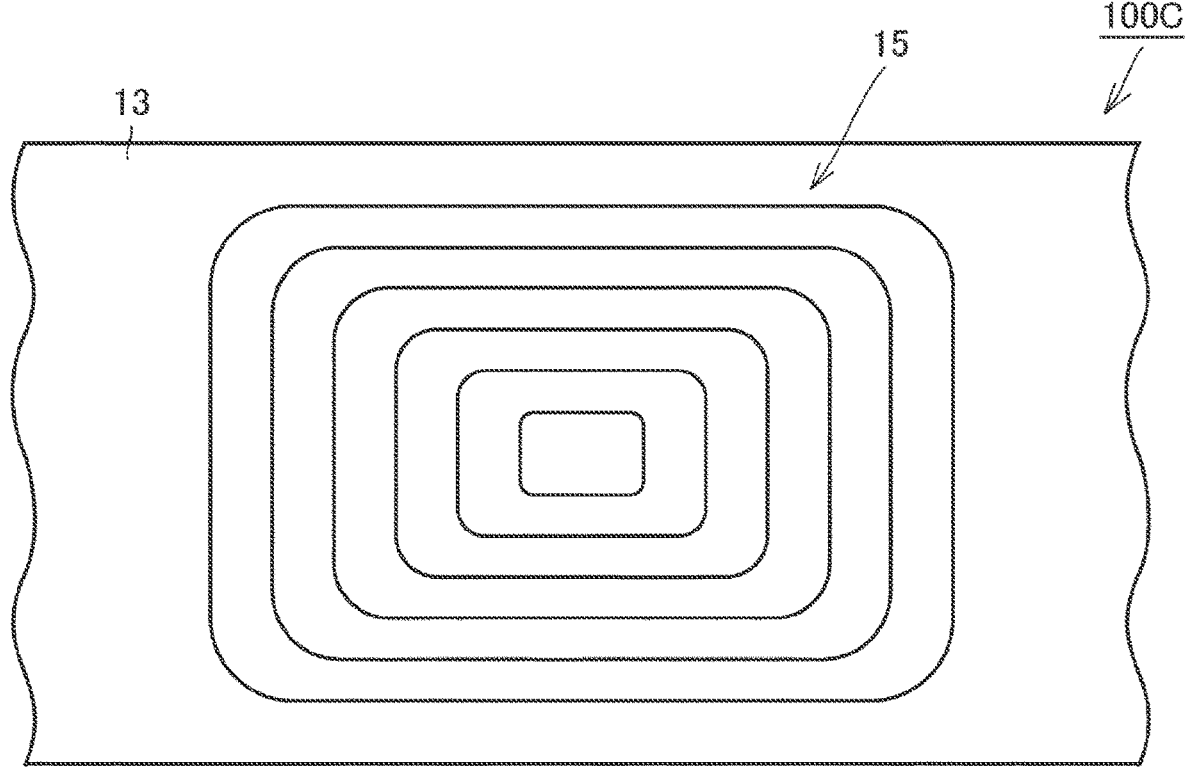
FIG. 11 is an enlarged plan view showing a joint between a positive electrode terminal and a negative electrode terminal of a battery according to a fourth embodiment.

FIG. 11 is an enlarged plan view showing a joint between a positive electrode terminal and a negative electrode terminal of a battery according to a fourth embodiment. A battery 100C according to the fourth embodiment will be described with reference to FIG. 11.

As shown in FIG. 11, the battery 100C according to the fourth embodiment differs from the battery 100 according to the first embodiment in the shape of each of the positive electrode terminal and the negative electrode terminal and, as a result, the shape of each of multiple weld marks.

In each of the positive electrode terminal and the negative electrode terminal, the length in a protruding direction in which the terminal protrudes from the electrode assembly is less than the length in a width direction perpendicular to the protruding direction. Thus, each of the multiple weld marks does not have a circular shape, and each of the multiple weld marks has a rectangular shape with rounded corners. In this case, the depth of each of the multiple weld marks may gradually reduce from the innermost side toward the outer side as in the case of the first embodiment, or may gradually increase from the innermost side toward the weld mark located at the predetermined inner side and gradually reduce from the weld mark located at the predetermined inner side toward the outermost periphery as in the case of the second and third embodiments.

In FIG. 11, in a manufacturing process for a battery, the manufacturing method for a welded structure may be performed in compliant with the manufacturing method for a welded structure according to the first embodiment or a manufacturing method for a welded structure may be performed in compliant with the manufacturing method for a welded structure according to the second embodiment. In any case, multiple laser trajectories each have a rectangular shape with rounded corners.

Even with such a configuration, substantially similar effects to those of the battery 100 and the manufacturing method for a welded structure according to the first embodiment are obtained from the battery 100C and the manufacturing method for a welded structure according to the fourth embodiment.

Fifth Embodiment

Figure 12:
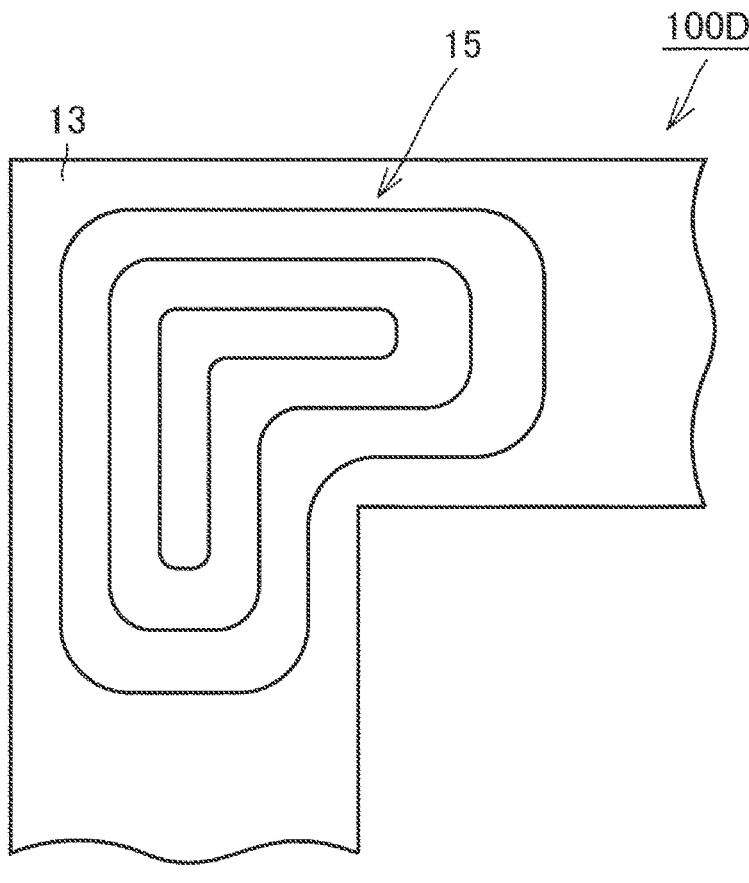
FIG. 12 is an enlarged plan view showing a joint between a positive electrode terminal and a negative electrode terminal of a battery according to a fifth embodiment.

FIG. 12 is an enlarged plan view showing a joint between a positive electrode terminal and a negative electrode terminal of a battery according to a fifth embodiment. A battery 100D according to the fifth embodiment will be described with reference to FIG. 12.

As shown in FIG. 12, the battery 100D according to the fifth embodiment differs from the battery 100 according to the first embodiment in the shape of each of the positive electrode terminal and the negative electrode terminal and, as a result, the shape of each of multiple weld marks.

The positive electrode terminal and the negative electrode terminal each have a substantially L shape. Thus, each of the multiple weld marks does not have a circular shape, and each of the multiple weld marks has a substantially L shape with rounded corners. In this case, the depth of each of the multiple weld marks may gradually reduce from the innermost side toward the outer side as in the case of the first embodiment, or may gradually increase from the innermost side toward the weld mark located at the predetermined inner side and gradually reduce from the weld mark located at the predetermined inner side toward the outermost periphery as in the case of the second and third embodiments.

In FIG. 12, in a manufacturing process for a battery, the manufacturing method for a welded structure may be performed in compliant with the manufacturing method for a welded structure according to the first embodiment or a manufacturing method for a welded structure may be performed in compliant with the manufacturing method for a welded structure according to the second embodiment. In any case, multiple laser trajectories each have a substantially L shape with rounded corners.

Even with such a configuration, substantially similar effects to those of the battery 100 and the manufacturing method for a welded structure according to the first embodiment are obtained from the battery 100D and the manufacturing method for a welded structure according to the fifth embodiment.

Other Modifications

In the first to fourth embodiments, the case where the positive electrode terminal 13 is the first welded member and the negative electrode terminal 14 is the second welded member is illustrated and described; however, the configuration is not limited thereto. The first welded member just needs to be a plate-shaped member made of a first metal, and the second welded member just needs to be a plate-shaped member made of a second metal different from the first metal.

In the first to fourth embodiments, in the step (S22) of applying a laser beam, a laser beam may be applied such that a spot diameter gradually reduces from a predetermined one of the weld marks, located on the inner side, toward the outermost periphery.

The embodiments described above are illustrative and not restrictive in all respects. The scope of the disclosure is defined by the appended claims. The scope of the disclosure encompasses all modifications within the meaning and scope equivalent to the appended claims.

What is claimed is:

1. A battery comprising:

a battery stack that includes a first single cell and a second single cell each having a plate-shaped positive electrode terminal made of a first metal and a plate-shaped negative electrode terminal made of a second metal and in which the first single cell and the second single cell are stacked such that each of the positive electrode terminals and an associated one of the negative electrode terminals are arranged in a stacking direction; and multiple loop weld marks welding each of the positive electrode terminals to the associated one of the negative electrode terminals, wherein the multiple loop weld marks are provided with a same central axis, the multiple loop weld marks include at least three loop weld marks, and a depth of each loop weld mark of the multiple loop weld marks progressively reduces from an innermost one of the multiple loop weld marks, located on an inner side, toward an outermost periphery of the multiple loop weld marks.

2. The battery according to claim 1, wherein an amount of alloy produced from the positive electrode terminal and the negative electrode terminal and contained in a weld mark of the multiple loop weld marks located at the outermost periphery is less than an amount of alloy contained in the innermost one of the multiple loop weld marks, located on the inner side.

3. The battery according to claim 1, wherein a width of the multiple loop weld marks reduces from the innermost one of the multiple loop weld marks, located on the inner side, toward the outermost periphery.

4. The battery according to claim 1, wherein the multiple loop weld marks include a first loop weld mark that is the innermost one of the multiple loop weld marks had has a first depth, a second loop weld mark adjacent the first loop weld mark and having a second depth that is less than the first depth, a third loop weld mark adjacent the second loop weld mark and having a third depth that is less than the second depth, and a fourth loop weld mark adjacent the third loop weld mark and having a fourth depth that is less than the third depth.

* * * * *